Patented Feb. 2, 1943

2,309,870

UNITED STATES PATENT OFFICE 2,309,870

DERIVATIVES OF p-AMINOBENZENE-SULPHONAMIDE

Arnold Salomon, Oss, Netherlands; vested in the Alien Property Custodian

No Drawing. Application October 27, 1938, Serial No. 237,319. In the Netherlands October 29, 1937

7 Claims. (Cl. 260—397.7)

This invention relates to new and useful derivatives of p-aminobenzenesulphonamide. This substance itself and a number of its derivatives are known to have therapeutic value. However, many substances of this class have the disadvantage of either a low solubility or a high toxicity or of both. Accordingly, an object of this invention is to provide new derivatives from this class which have neither of these disadvantages and still exert the same remarkable action as p-aminobenzenesulphonamide itself.

In my copending application Ser. No. 222,535 such derivatives containing two p-iminobenzenesulphonyl residues have been described.

According to the present invention derivatives with more than two residues per molecule are prepared; the process according to which these new derivatives are prepared is analogous to the process used in my above-mentioned copending application in that the condensation is effected by the interaction of a compound carrying an —$SO_2$-halogen group and a compound carrying an —$NH_2$-group. By the interaction hydrogen halide is split off and thus the condensation is effected by the formation of an —$SO_2.NH$-group. The process of splitting off hydrogen halide from a compound containing an —$SO_2$-halogen group and a compound containing an —$NH_2$-group is not new in itself; it is, however, surprising that it leads to derivatives with more than two p-iminobenzenesulphonyl residues per molecule which are therapeutically active and devoid of the disadvantages of p-aminobenzenesulphonamide.

The starting materials for the process of the present invention are numerous the only conditions being that (a) a $SO_2$-halogen group be present in one of the components; (b) a free $NH_2$-group be present in the other component; (c) a compound with more than two p-iminobenzenesulphonyl residues being formed by the splitting off of hydrogen halide.

Amino groups which are not to enter into reaction are preferably protected, e. g., by acylation or alkylation.

It is to be understood that this invention only contemplates such compounds which somewhere in the molecule contain the group

—$SO_2$—$NH$—$SO_2$— only derivatives containing this group being capable of forming easily soluble metal derivatives, especially alkali metal, e. g., sodium derivatives which have the character of salts.

Accordingly the simplest products of the present invention are the di-(p-aminobenzenesulphonyl) p'-iminobenzenesulphonimid $NH_2.C_6H_4.SO_2.NH.SO_2.C_6H_4.NH.SO_2.C_6H_4.NH_2$ its derivatives, acylated or alkylated in one or both of the terminal $NH_2$ groups and their salts.

According to the above these compounds can be prepared in a number of ways, e. g., by the interaction of:

(1) $NHXC_6H_4SO_2$-halogen
    $+ NH_2.SO_2.C_6H_4.NH.SO_2.C_6H_4.NHX$
(2) $NHXC_6H_4SO_2$-halogen
    $+ NH_2.C_6H_4.SO_2.NH.SO_2.C_6H_4.NHX$
(3) $NHXC_6H_4SO_2.NH.C_6H_4.SO_2$-halogen
    $+ NH_2.SO_2.C_6H_4.NHX$
(4) $NHXC_6H_4SO_2$-halogen $+ NH_2.SO_2.C_6H_4.NH_2$
    $+$ halogen-$SO_2.C_6H_4.NHX$ (which can also be written as:
$2NHXC_6H_4SO_2$-halogen $+ NH_2SO_2.C_6H_4.NH_2$)

Herein X stands for a hydrogen, acyl or alkyl. If desired, the acyl or alkyl groups may be saponified, substances with free $NH_2$ groups being formed. The latter can then serve again for a further condensation with compounds from this class containing an —$SO_2$-halogen group whereby compounds with 4, 5 or more p-aminobenzenesulphonyl groups in the molecule are formed.

The condensation occurs already by simply dissolving or suspending the components in water and shaking or boiling the solution or suspension for a long time. The reaction may also be carried out in an alkaline medium for which purpose the reaction solution may be made alkaline, e. g., with the carbonates of the alkali or earth-alkali metals or pyridine or dilute alkali-hydroxide (the latter method is known as Schotten-Baumann method).

The product referred to above, di(p-aminobenzenesulphonyl) p'-iminobenzenesulphonimid, its derivatives acylated in the terminal $NH_2$ groups and its salts have the properties of being active in combating streptococcus and gonococcus infections, of having a very low toxicity and of being soluble at approximately neutral reaction in the form of salts, e. g., of the alkali metals. A neutral solution containing about 1% is absolutely harmless to animal and human tissues and is accordingly suitable even for use in ophthalmology, e. g., in combating conjunctivitis.

In order to secure a clear understanding of my invention the following examples are given by way of illustration.

*Example 1.*—33.7 g. of di-(p-aminobenzenesulphonyl)-amine in which one $NH_2$ group has been acetylated $(NH_2.C_6H_4.SO_2.NH.SO_2.C_6H_4.NH.CO.CH_3)$ are dissolved with 23,3 g. of p-acetylaminobenzenesulphonylchloride in 100 cc. of water and boiled for some hours. It is preferred to add also 15 g. of sodium carbonate for neutralisation of the hydrochloric acid formed.

After termination of the reaction the solution is allowed to cool just to room temperature, afterwards in a refrigerating mixture. A part of the di(p-acetylaminobenzenesulphonyl)-p'-iminobenzenesulphonimid crystallizes and is filtered with suction. The sodium salt which is formed with sodium hydroxide or sodium carbonate can be recrystallized from ethanol.

From the mother liquor a further quantity is obtained by evaporation. Here too the purification can be effected by recrystallisation of the sodium salt from ethanol.

*Example 2.*—33.7 g. of p-acetylaminobenzenesulphonyl-p'-iminobenzenesulphonamide $(NH_2SO_2.C_6H_4.NH.SO_2.C_6H_4NH.CO.CH)$ are dissolved with 23.3 g. of p-acetylaminobenzenesulphonylchloride in 100 cc. of water and boiled for some hours. A quantity of sodium carbonate similar to that used in Example 1 may be added. The reaction mixture is worked up according to Example 1.

*Example 3.*—17.2 g. (=0.1 mol) of p-aminobenzenesulphonamide and 46.6 g. (=0.2 mol) of p-acetylaminobenzenesulphonylchloride are suspended in 100 cc. of water and boiled for some time. The mixture is then worked up according to Example 1.

What I claim is:

1. Di-(p-acetylaminobenzenesulphonyl-p'-iminobenzenesulphonimid having the formula $$CH_3.CO.NH.C_6H_4.SO_2.NH.SO_2.$$
$$C_6H_4.NH.SO_2.C_6H_4.NH.CO.CH_3$$

2. The sodium salt of di-(p-acetylaminobenzenesulphonyl) - p' - iminobenzenesulphonimid having the formula $$CH_3.CO.NH.C_6H_4.SO_2NNaSO_2.$$
$$C_6H_4.NH.SO_2.C_6H_4.NH.CO.CH_3$$

3. A substance of the group consisting of compounds having the formula $$X(p\text{-}NH.C_6H_4.SO_2)_aNH(p\text{-}NH.C_6H_4.SO_2)_bX$$

and alkali metal salts thereof, wherein X represents a radical of the group consisting of hydrogen and acetyl and $a$ and $b$ are small whole numbers and the sum of $a$ and $b$ exceeds two.

4. A substance having the formula:

$$X(p\text{-}NH.C_6H_4.SO_2)_aNH(p\text{-}NH.C_6H_4.SO_2)_bX$$

wherein X is hydrogen and $a$ and $b$ are small numbers and the sum of $a$ and $b$ is more than two.

5. A substance having the formula:

$$X(p\text{-}NH.C_6H_4.SO_2)_aNH(p\text{-}NH.C_6H_4.SO_2)_bX$$

wherein X is acetyl and $a$ and $b$ are small numbers and the sum of $a$ and $b$ is more than two.

6. Alkali metal salts of a substance having the formula:

$$X(p\text{-}NH.C_6H_4.SO_2)_aNH(p\text{-}NH.C_6H_4.SO_2)_bX$$

wherein X is hydrogen and $a$ and $b$ are small numbers and the sum of $a$ and $b$ is more than two.

7. Alkali metal salts of a substance having the formula:

$$X(p\text{-}NH.C_6H_4.SO_2)_aNH(p\text{-}NH.C_6H_4.SO_2)_bX$$

wherein X is acetyl and $a$ and $b$ are small numbers and the sum of $a$ and $b$ is more than two.

ARNOLD SALOMON.